United States Patent [19]

Stohs

[11] Patent Number: 4,726,159
[45] Date of Patent: Feb. 23, 1988

[54] COMPOSITE METAL/CONCRETE FLOOR AND METHOD

[75] Inventor: Larry A. Stohs, Columbia, S.C.

[73] Assignee: Consolidated Systems, Inc., Columbia, S.C.

[21] Appl. No.: 626,721

[22] Filed: Jul. 2, 1984

[51] Int. Cl.$^4$ .......................... E04B 5/48; E04F 17/08; E04F 19/08

[52] U.S. Cl. .......................................... 52/99; 52/100; 52/126.2; 52/173 R; 52/220; 52/221; 52/630; 52/741; 174/48; 220/3.3; 220/3.8

[58] Field of Search ................. 52/220, 221, 126.2, 52/336, 630, 99, 100, 179 R, 741; 174/48; 220/3.3, 3.8, 5.2

[56] References Cited

U.S. PATENT DOCUMENTS

| | | | |
|---|---|---|---|
| 2,090,483 | 8/1937 | Mendez | 52/336 X |
| 2,912,848 | 11/1959 | Lee et al. | 52/221 |
| 3,061,663 | 10/1962 | Reiland | 52/126.2 X |
| 3,204,378 | 9/1965 | Stuessel et al. | 52/221 |
| 3,303,264 | 2/1967 | Saul et al. | 52/221 X |
| 3,417,191 | 12/1968 | Fork | 52/221 |
| 3,426,802 | 2/1969 | Fork | 52/221 |
| 3,453,791 | 7/1969 | Fork | 52/126.2 X |
| 3,494,084 | 2/1970 | Hazen | 52/126.2 X |
| 3,550,336 | 12/1970 | Halkovich et al. | 52/221 X |
| 3,592,956 | 7/1971 | Fork | 52/221 X |
| 3,721,051 | 3/1973 | Fork | 52/221 X |
| 3,793,793 | 2/1974 | Dobbins | 52/221 |
| 3,812,636 | 5/1974 | Albrecht et al. | 52/221 X |
| 3,820,295 | 6/1974 | Folley | 52/630 X |
| 3,851,674 | 12/1974 | Fork | 52/221 X |
| 3,886,702 | 6/1975 | Fork | 52/221 |
| 3,903,666 | 9/1975 | Fork | 52/221 |
| 3,932,696 | 1/1976 | Fork et al. | 52/221 X |
| 3,956,864 | 5/1976 | Fung | 52/335 X |
| 4,041,238 | 8/1977 | Penczak | 52/221 X |
| 4,065,896 | 1/1978 | Penczak | 52/220 |
| 4,144,369 | 3/1979 | Wass | 52/336 X |
| 4,178,469 | 12/1979 | Fork | 52/221 X |
| 4,194,332 | 3/1980 | Fork | 52/220 |
| 4,338,484 | 7/1982 | Littrell | 52/221 X |
| 4,453,349 | 6/1984 | Ryan | 52/630 X |
| 4,453,364 | 6/1984 | Ting | 52/220 X |
| 4,454,692 | 6/1984 | Ault | 52/221 |
| 4,507,900 | 4/1985 | Landis | 52/221 |
| 4,554,771 | 11/1985 | Marwah et al. | 174/48 X |
| 4,630,414 | 12/1986 | Ting | 52/220 |

FOREIGN PATENT DOCUMENTS 3506 8/1979 European Pat. Off. .
1176824 4/1959 France .

OTHER PUBLICATIONS

Airtherm Steel Deck Systems, Catalog 225.

Primary Examiner—Alfred C. Perham
Attorney, Agent, or Firm—L. Lawton Rogers, III; Joseph M. Killeen

[57] ABSTRACT

A composite metal/concrete floor system and method of installation. The system includes a novel decking profile; snap-in cover plates to provide longitudinal cells for three services; a lateral trench with sheet metal rails and bottom plates; and cooperating preset inserts.

38 Claims, 29 Drawing Figures

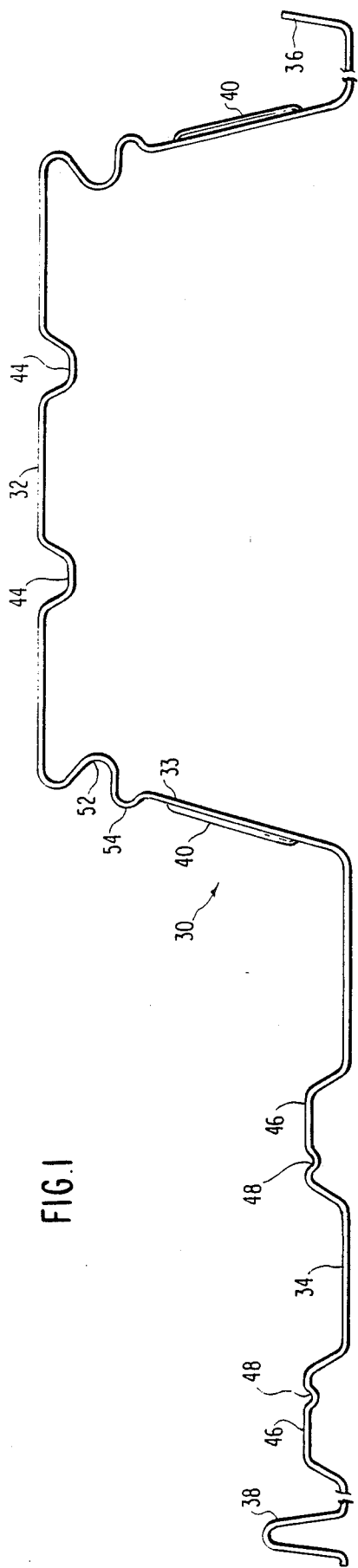
FIG.1
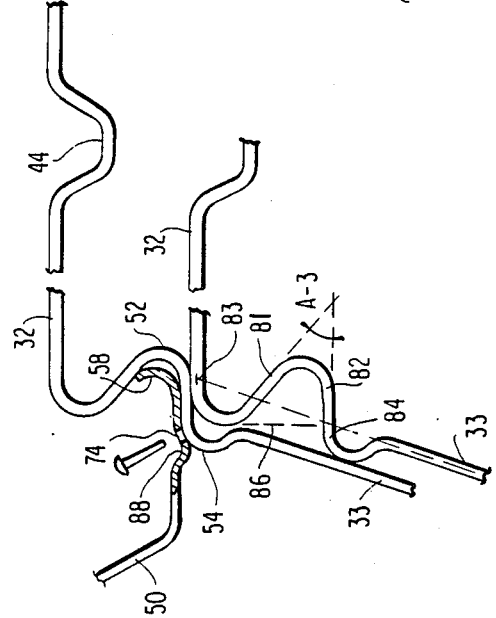
FIG.7
FIG.8
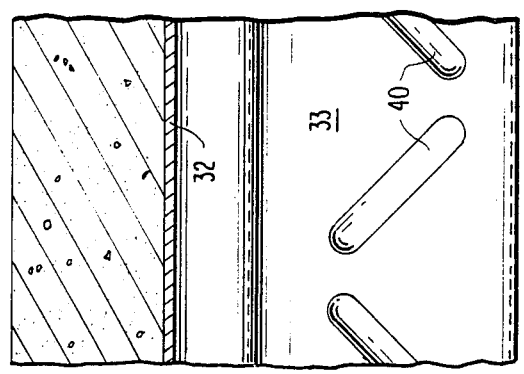
FIG.3
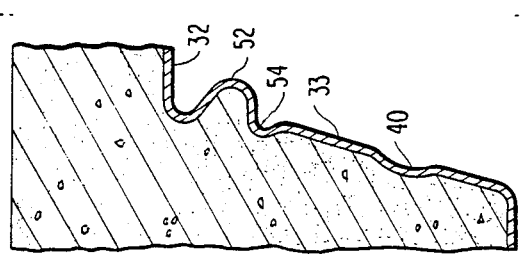
FIG.2

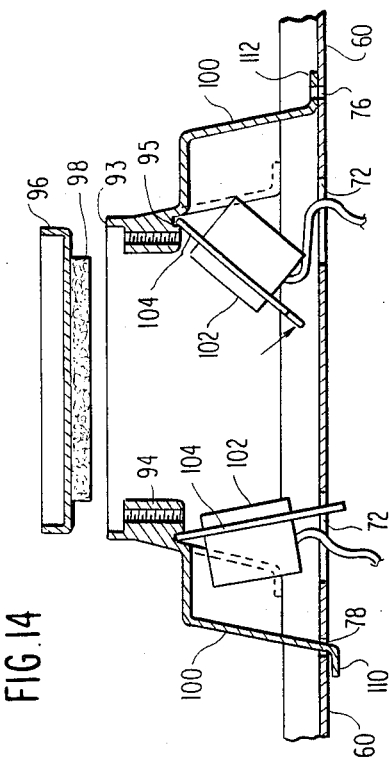
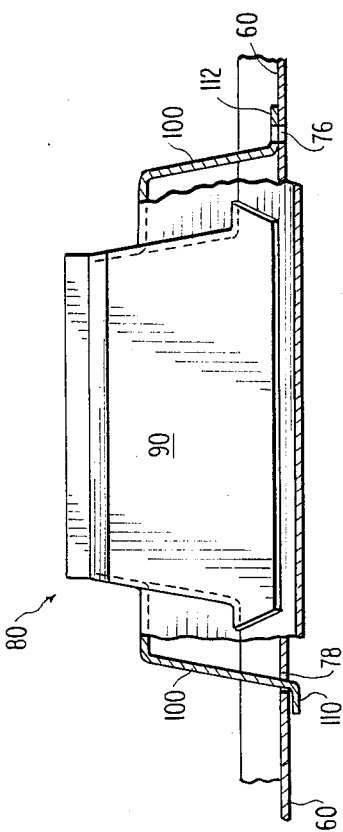
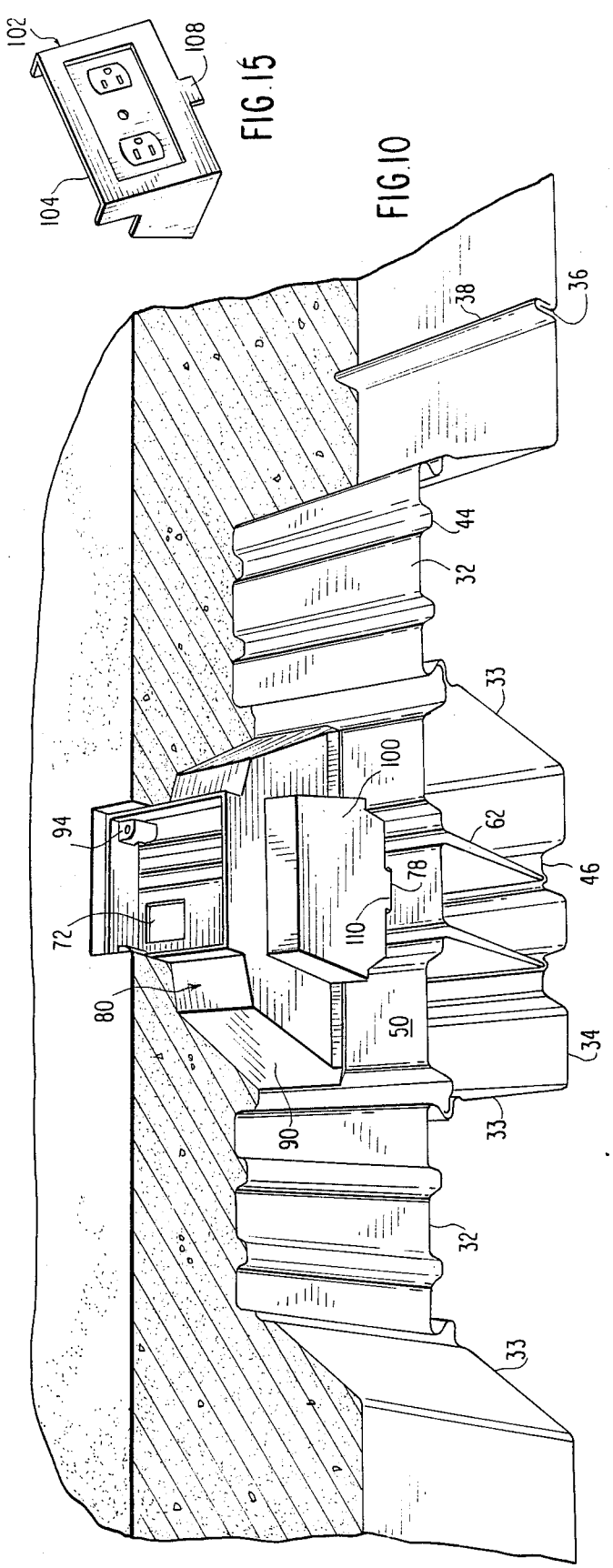

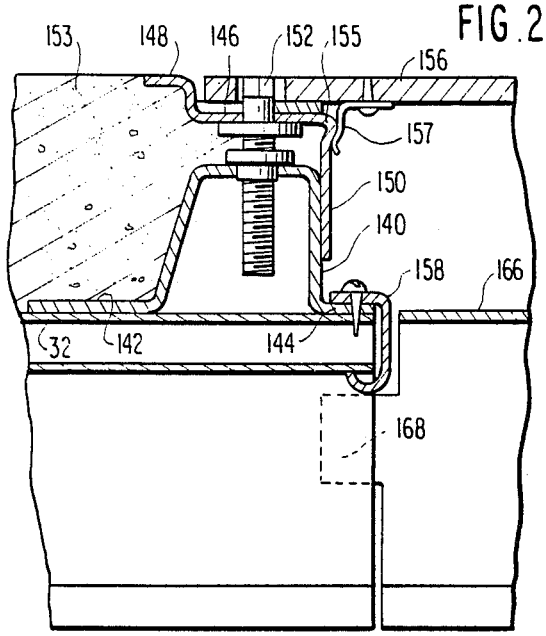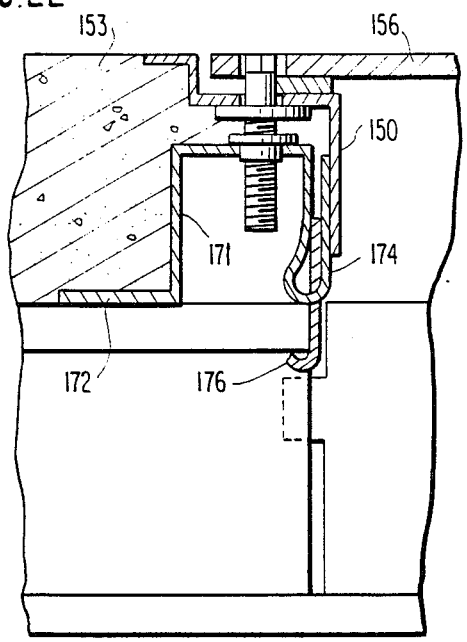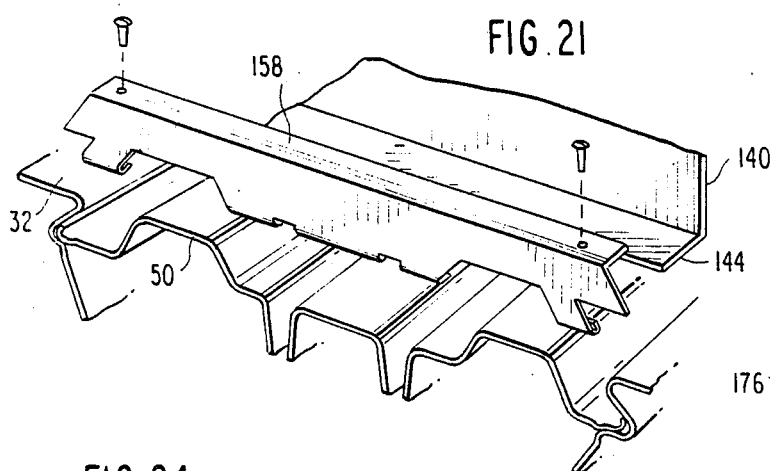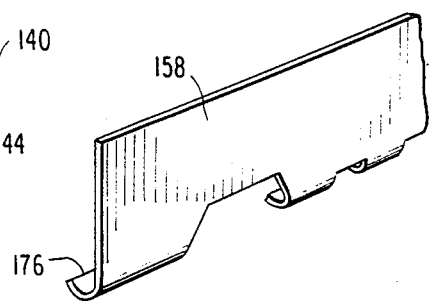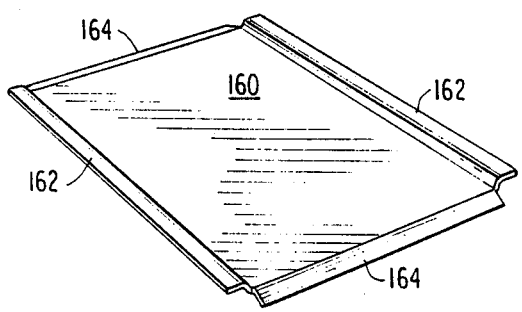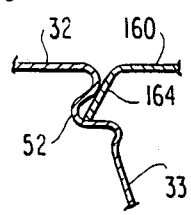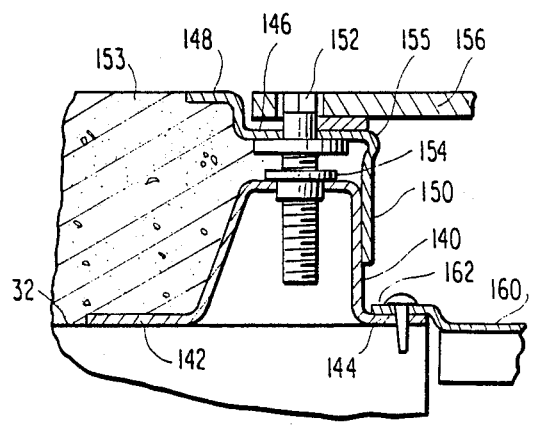

COMPOSITE METAL/CONCRETE FLOOR AND METHOD

BACKGROUND OF THE INVENTION

The present invention relates to an improved electrified composite metal/concrete floor.

Such floors are well known and comprise a corrugated metal decking over which concrete is poured. Such floors are often electrified in that electrical power and telephone and other communication services are distributed in the cells underlying the raised portions or crests of the decking, with access to the interior of the cells from the upper surface of the floor provided by inserts preset at selected intervals prior to the concrete pour. Access of the services to the interior of the longitudinal cells is generally provided by a lateral trench overlying the metal decking, which trench includes parallel rails covered with a metal plate coplanar with the upper surface of the concrete floor when poured.

In one aspect, the present invention includes a novel metal decking profile, with grooves adjacent the lateral edges of the crests to receive the concrete of the composite floor, stable when stacked during shipment to the job site.

Grooves adjacent the crests of decking to receive concrete are well known. For example, FIG. 4 of the French Pat. No. 1,176,824 granted Nov. 28, 1958 to Wendel shows a decking profile in which the radii of the bend at the lateral edge of the crest and the bottom of the groove are equal and in which the centers for the bends are vertically spaced approximately twice such radii. Concrete enters the groove to enhance the metal/concrete interaction when the concrete is poured. Stacking is stabilized by making the radius bend of the lateral edge of the lower side of the groove slightly larger than such radii to mate with the lateral edge of an underlying decking member. However, the semi-cylindrical radius bends will not permit adequate concrete entry when used with cover plates, and do not provide adequate deformation resistance to downward pressure from the lateral edges of the crests.

Grooves adjacent the lateral edge of metal decking are also shown in the Ting U.S. Pat. No. 4,453,364 dated June 2, 1984. In that patent, the grooves have a horizontal lower side and an upper side joining the radius bend of the lateral edge of the crest at an angle of approximately forty-five degrees. The Ting grooves are constructed such that a vertical line passing through the lateral edge intersects the lower side of the groove rather than the side wall of the valley and such that the intersection of the planes of the side wall and crest is at or outside the lateral extremity of the crest, i.e., the center of the bends of the crest, groove and side wall are horizontally displaced from each other. While resistance is enhanced, the amount of concrete which can enter the groove is inadequate when cover plates are used. Moreover, the location of the lateral edge of the crests interiorly of the intersection of the planes of the side wall and crest results in instability in stacking.

The decking profile of the present invention combines the stacking stability of Wendel with the improved strength of Ting and enhances the metal/concrete interaction. In one embodiment, this improvement is obtained by increasing the vertical separation of the centers of the radius bends of the crest and groove so as to join the groove and crest edge at an angle of approximately forty-five degrees. Stacking stability is enhanced by the matching of the radius bends of the side wall and crest.

In another embodiment, the decking profile of the present invention further enhances the concrete/groove interface by establishing a projection in the side wall immediately below the groove to thereby extend the horizontal lower wall of the groove. Stability when stacked is enhanced by the abutment of the projection with the side wall at a point on the side wall below the crest.

In another aspect, the present invention includes snap-in cover plates for selected valleys of the decking to form longitudinal cells for electrification of the floor. Longitudinal cells for this purpose are well known. They may be formed by welding of the decking to an underlying plate as disclosed in the Penczak U.S. Pat. No. 4,041,238 dated Aug. 9, 1977, the Fork U.S. Pats. No. 4,178,469 dated Dec. 11, 1979, or No. 3,426,802 dated Feb. 11, 1969; or the Littrell U.S. Pat. No. 4,338,484 dated July 6, 1982. They may also be formed by snap-in plates beneath the crests of the decking as disclosed in the Fork U.S. Pat. No. 4,194,322 dated Mar. 25, 1980, and the Albrecht, et al. U.S. Pat. No. 3,812,636 dated May 28, 1974. The decking is, however, structurally weakened by the apertures necessary for access to the cells.

Others such as disclosed in the Fork European Pat. No. 0003506, the Fork U.S. Pat. No. 3,592,956 dated July 13, 1971, or the Lee, et al. U.S. Pat. No. 2,912,848 dated Nov. 17, 1959 have provided cover plates for a valley to thereby create longitudinal cells.

However, such systems generally provide a smooth upper surface with reduced metal/concrete interaction, do not provide for separation of services within the cell, span the valley without intermediate support, are not resiliently compressible for snapin and do not have upturned lateral edges for prevention of water seepage during the concrete pour.

Other systems such as disclosed in the Ting U.S. Pat. application Ser. No. 340,869 filed Jan. 20, 1982 (now abandoned) utilize grooves adjacent the crests for retention of the cover plates. While this provides an upturned edge for prevention of water seepage, the reduced height of the cell is generally unacceptable in that the reduced volume will not accommodate a duplex receptacle. Moreover, concrete/metal interaction is significantly reduced by the flat surface and the substantial filling of the groove of decking by the edge of the cover plate as shown in FIGS. 4 and 5 of the Ting application. The Ting application teaches support of the cover plates intermediate the crests. However, the separation of the cell into two services by two interconnected but spaced apart legs further reduces the volume of the two cells, when three are needed.

The cover plates of the present invention are stackable for shipment to the job site and are easily installed from above the decking, thus greatly reducing installation costs. In one embodiment, they may be made of sheet metal and provided with two double walled legs to provide support intermediate the crests. The legs may be constructed to provide resiliency and thus secure engagement with the grooves. Metal/concrete interaction is also enhanced, and additional space for three services provided, by the selective raising of position of the cover plate to the same height of the crests, and by a decking profile which permits the entry of substantial concrete into the grooves even with the lateral edges of the cover plate engaged therein.

In still another aspect, the present invention includes a preset insert uniquely cooperating with the cover plates for access to the cells defined by the decking valley and cover plate. Known preset inserts such as disclosed in the Fork et al U.S. Pat. No. 3,932,696 dated Jan. 13, 1976 and Penczak U.S. Pat. No. 4,041,238 dated Aug. 9, 1977 span adjacent crests and are designed to provide access to cells beneath the crests. Others such as Fork U.S. Pat. No. 3,417,191 dated Dec. 12, 1968 fit between the crests to provide access to cells beneath the crests, and still others such as Fork U.S. Pat. No. 3,592,956 dated July 13, 1971 span two crests to provide access to cells beneath adjacent crests as well as a cell in the intervening valley.

In various embodiments, the preset inserts of the present invention are stackable for shipment to the job site, may be constructed of sheet metal, provide ready access to all three longitudinal cells, and cooperate with snap-in electrical power receptacles.

In the present invention, preset inserts may be carried solely by the cover plates and either, or both, may cooperate with the grooves in the decking without significant diminution of the area of the cell.

In yet another aspect, the present invention includes a novel lateral trench for distribution of the services to the longitudinal cells. Prior art trenches such as disclosed in the Fork U.S. Pat. No. 3,886,702 dated June 3, 1975 generally extrude vertically adjustable side rails of aluminum. Many of the above, such as Fork et al U.S. Pat. No. 3,932,696 dated Jan. 13, 1976 and Penczak U.S. Pat. No. 4,065,896 dated Jan. 3, 1978 utilize the crests of the decking as the floor of the trench and carry vertical concrete stops which depend into the valley. In this way, the valley floor of the decking also becomes the floor of the trench. Such trenches are often referred to as "bottomless". However, the use of the valley floor as the bottom of the trench requires that the concrete be interrupted by the depending stops to prevent filling of the trench with concrete from the valleys underlying the trench. Such interruption effects a significant loss of strength of the completed floor.

In various embodiments, the present invention in various aspects provides rails of sheet metal of greatly reduced cost, and snap-in bottoms for the trench intermediate the electrified cells. Concrete may thus flow uninterrupted through the non-electrified valley beneath the trench.

These and the many other aspects and advantages of the present invention may more readily be understood from the claims and from the following detailed description when read in conjunction with the appended drawings.

THE DRAWINGS

FIG. 1 is an end view in elevation of one embodiment of a decking member of the present invention;

FIG. 2 is a section in elevation of the decking member of FIG. 1 with concrete poured thereon illustrating the concrete decking member interface;

FIG. 3 is a partial section in elevation taken through lines 3—3 of FIG. 2;

FIG. 7 is a partial end view in elevation illustrating the attachment of the cover plate of FIGS. 5 and 6 to the decking member of FIG. 1, and illustrating the nestability of the decking members of FIG. 1;

FIG. 8 is a partial end view in elevation illustrating the attachment of the cover plate of FIGS. 5 and 6 to a second embodiment of the decking members of the present invention, and illustrating the nestability of the decking members;

FIG. 10 is a pictorial view in a partial section illustrating the composite floor of the present invention with a preset insert in place over an electrified valley;

FIG. 12 is a section in elevation taken through lines 12—12 of FIG. 11;

FIG. 14 is a section in elevation taken through lines 14—14 of FIG. 11, illustrating the mounting of the electrical receptacles;

FIG. 15 is a pictorial representation of the electrical receptacle of FIG. 14;

FIG. 20 is a partial section in elevation taken through the center of an electrified valley at the junction of the distribution trench and illustrating one embodiment of trench construction of the present invention;

FIG. 21 is a pictorial representation illustrating the configuration and mounting of the decking member end partition of FIG. 20;

FIG. 22 is a partial section in elevation taken through the center of an electrified valley at the junction with the trench and illustrating a second embodiment of the trench of the present invention;

FIG. 23 is a pictorial view of the decking member end partition of the embodiment of FIG. 22;

FIG. 24 is a pictorial view of a second embodiment of the trench bottom plates of FIG. 4 in which the bottom plate spans several valleys;

FIG. 25 is a partial section in elevation illustrating the end construction of the bottom plates of FIG. 24 and the mounting thereof with the decking member of FIGS. 7 or 8;

FIG. 26 is a partial section in elevation illustrating the lateral construction and mounting of the bottom plates of FIG. 24 with the trench illustrated in FIG. 20.

THE DETAILED DESCRIPTION

The Decking Members

Figure 4:
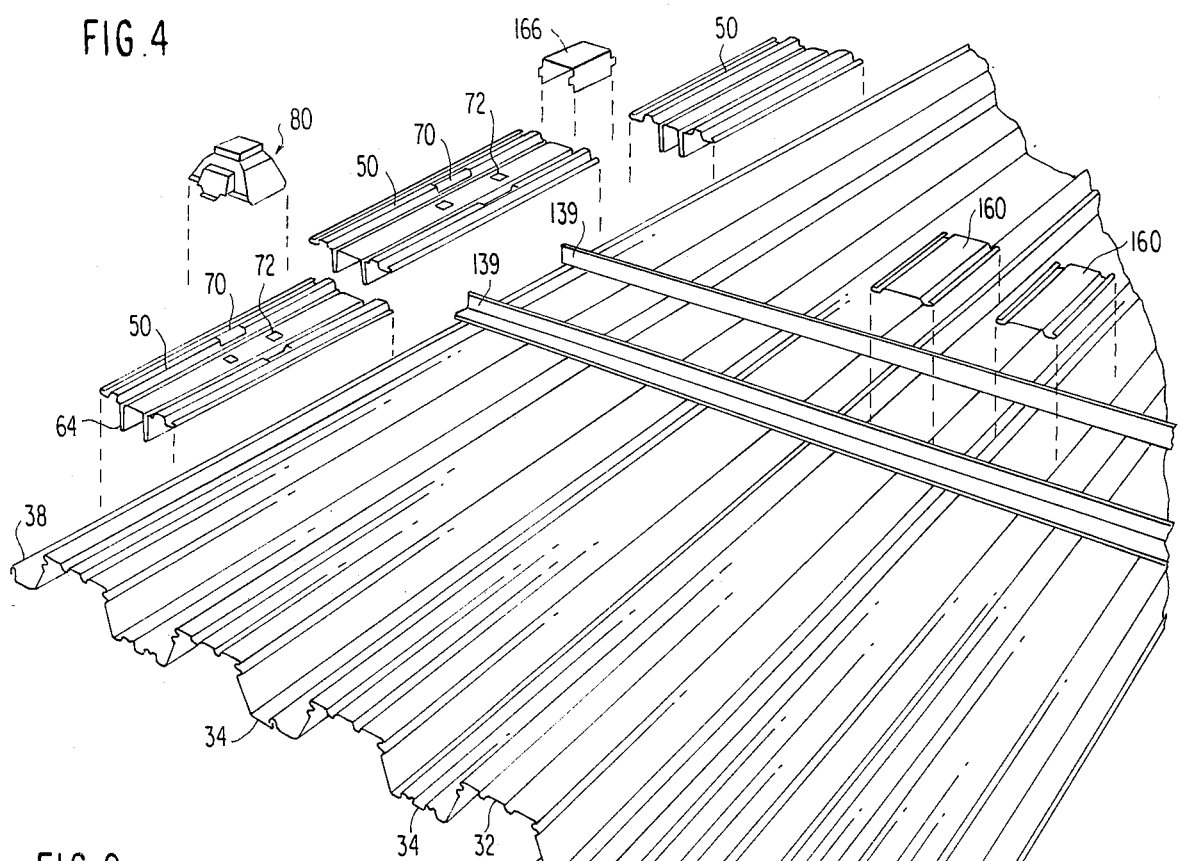
FIG. 4 is a pictorial view, partly exploded, illustrating the assembly of one embodiment of the electrical distribution system.

With reference now to the drawings, one embodiment of the decking member of the present invention is illustrated in FIGS. 1-3. As shown therein, the decking member indicated generally by the numeral 30 includes alternating crests 32 and valleys 34. As shown in the system drawing of FIG. 4, the decking members may each include two crests 32 and two valleys 34 with the lateral edges of the decking member 30 forming one-half of a valley and including mating means such as an upturned edge 36 on one lateral edge and a downturned groove 38 on the other lateral edge. Of course, each decking member may include additional crests and valleys. However, it is desirable to avoid potential damage to electrical wiring from the rough lateral edges of the decking member and only an interior complete valley of a decking member will be electrified.

As shown in FIGS. 1-4, the crests 32 and valleys 34 are substantially coplanar and are interconnected by slanting sidewalls 33. The sidewalls 33 may be provided with a series of embossments 40 extending into or protruding from the sidewall to provide additional surface area and corrugations for contact with the concrete thereafter poured thereon, as shown in FIGS. 2 and 3.

As shown in FIG. 1, each of the crests 32 may be provided with one or more, preferably two, spaced stiffening beads 44 which enhance not only the structural strength of the crest but also the bonding of the decking member to the concrete when poured thereon.

As shown in FIG. 1, each of the valleys 34 may also be provided with two longitudinal stiffening beads or projections 46 extending upwardly from the floor of the valley. In addition and to increase structural strength for the decking member 30, the projections 46 may include a groove 48 or other configuration for mating with the downward extending legs 64 of the cover plates of 50 shown in FIGS. 4-6 placed end to end over one of the valleys selected for electrification. The groove 48 provides increased stability until the concrete has been poured, in that it resists rotation of the cover plates when subjected to the load of construction traffic, etc. on the corners defining the lateral edges of the surface 56.

Figure 5:
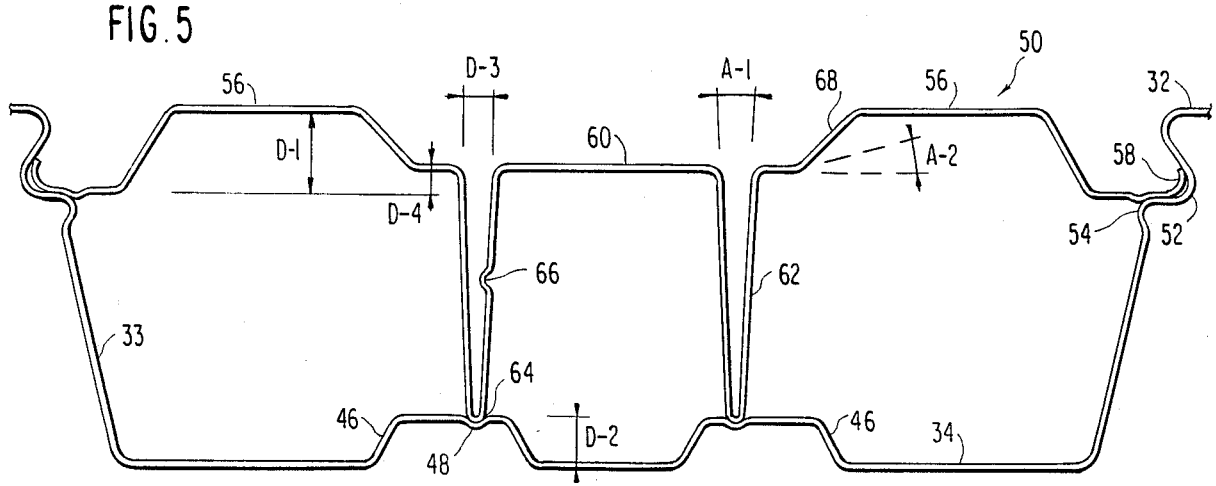
FIG. 5 is a section in elevation illustrating one embodiment of the cover plate of the present invention in place over one of the valleys of the decking member of FIG. 1 to form a three electrical service cell.

As shown in FIGS. 1, 2 and in the section of FIG. 5, the sidewall 33 of the decking member 30 includes an upper portion having a groove 52 and a projection 54 immediately adjacent the crest 32. The sidewall 33 also includes a substantially longer planar lower portion so that the groove and crest is in the upper portion adjacent the crest.

With reference to FIG. 7 where the decking member of FIG. 1 is illustrated in greater detail, it may be seen that the groove 52 in the upper portion of the sidewall includes an upper leg 81 and a lower leg 82. The upper leg is disposed at an angle A-3 of between about forty and about fifty degrees to the horizontal and the lower leg 82 is substantially horizontal and fairs smoothly into the horizontal portion 84 of the projection 54. It may thus be seen that a vertical line 86 dropped from the widest portion of the crests 32 intersects the upper surface 84 of the projection 54 rather than the lower leg 82 of the groove 52. It may also be seen that the outermost projection of the crest is laterally outside of the intersection 83 of the planes of the crest 32 and the sidewall 33.

With continued reference to FIG. 7, the projection 54 on the sidewall 33 of the decking member provides increased stability for the lateral edge of the cover plate where a groove 88 is rolled into the lateral edge of the cover plate 50. As illustrated in FIGS. 7 and 8, the radii of the groove 88 and projection 54 may cooperate to increase stability. The location of the aperture 74 in the bend disposes the aperture at an angle to the vertical which insures that a fastener placed therein will penetrate the sidewall of the decking member and thus avoid the danger of diversion into the electrified valley.

As may also be seen in FIG. 7, the decking member 30 of FIG. 1 may be stacked for shipment with the underside of the groove 52 supported by the crest 32 of the underlying decking member. When so stacked, the projection 54 engages the interior of the sidewall 33 of the overlying decking member to provide increased lateral stability to the stack of decking members.

A second embodiment of the decking member of the present invention is illustrated in FIG. 8. With reference to FIG. 8, it may be seen that the projection 54 of the embodiment of FIG. 7 may be omitted without losing the desirable mounting relationship of the cover plate 50 therewith by the lengthening of the upper leg of the groove 52. As shown in FIG. 8, the radii of curvature R-1 and R-2 are the same with the radius of curvature R-3 being greater than R-1 by slightly more than the thickness of the sidewall 33 of the decking member. In this way, the junction of the lower leg 82 of the groove 52 with the lower portion of the sidewall will overlie the upper surface of the junction of the upper leg 81 of the groove with the crest 32 to provide lateral stability for the decking members when stacked for shipment and for storage at the job site.

As may also be seen from FIG. 8, the outer edge of the crest is outside the intersection 83 of the planes of the sidewall 33 and crest 32 and a vertical line 86 through the lateral edge of the crest will intersect the sidewall structure at or outside the plane of the sidewall 33.

The Cover Plates

The cover plate 50 of FIG. 4 is illustrated in greater detail in FIGS. 5 and 6 and in a preferred embodiment includes three lateral sections, each of the two outer sections having a flat portion 56 at the same elevation as that of the crest 32 and an outer edge portion at a distance D-1 below the elevation of the crest 32. As illustrated in FIG. 5, the outer edge portion includes an edge upturned to present an outwardly convex projection 58 for entry into the groove 52 formed in the upper portion of the sidewall 33 of the decking member.

With continued reference to FIG. 5, the center section of the cover plate 50 includes a flat portion 60 interconnected with the flat portions 56 of the outer sections by the dual wall downwardly extending legs 62. The cover plate 50 is desirably one-piece construction with the dual wall leg 62 being open at the upper end and closed at the lower end 64 to mate with the groove 48 in the upper surface of the projection 46. The height D-2 of the projection 46 above the valley is desirably dimensioned not only to provide stiffening of the valley floor of the decking member, but to reduce the length of the leg 62 necessary to support the flat surfaces 56 of the cover plate substantially coplanar with the crest 32.

As may be seen in FIG. 5, the lateral distance between the convex projections 58 of the cover plate 50 is greater than the lateral distance between the adjacent crests 32. However, the legs 62 act as spring members permitting resilient lateral compression of the upper portions of the leg 62 sufficient for the lateral edges 58 of the cover plate 50 to enter the grooves 52 beneath the crest 32. As shown in FIG. 5, the dual wall leg 62 may be provided with a projection 66 or other means to enhance the leg 62 separating bias. It has been found, for example, that a separation D-3 of approximately one-third of the depth of the groove 52 is adequate. This distance D-1 and the angle A-1 between the two walls of the leg 62 is exaggerated in the illustration of FIG. 5 which approximates the spacing prior to installation. Once snapped into place as shown in FIG. 5, this distance may be about one-half the distance illustrated.

As shown in FIG. 5, the laterally outward side of the dual wall legs 62 is joined to the flat portion 56 of the outer section by an upwardly and outwardly inclined portion 68. As shown in FIG. 6, each of the cover plates 50 may be provided with a first pair of laterally separated knock-outs 70 encompassing laterally the entire space of the inclined portion 68 and about seventy-five percent of the flat portion 56 of each outer section. The effect of the reduction in the height of the flat portion 60 of the inner section below that of the flat portion 56 of the outer section (D-1 less D-4) provides an effective angle of entry A-2 to the horizontal of about fifteen degrees. This effective downward and outward entry into the outer two of the three longitudinal cells of the electrified valley facilitates the handling of the electrical wiring contained therein. In addition, the reduction in height provides space for a duplex receptacle.

Figure 6:
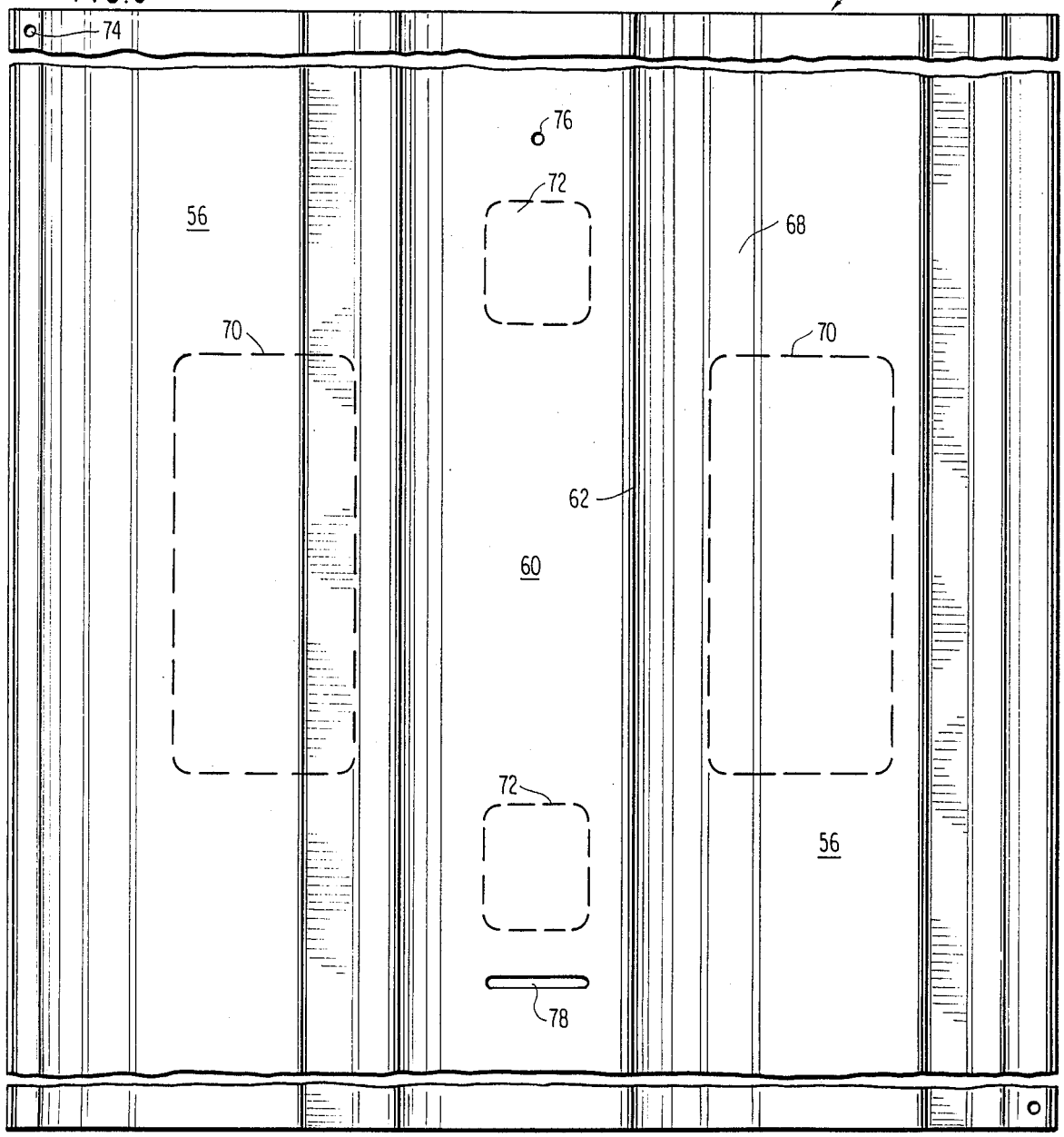
FIG. 6 is a top plan view of the cover plate of FIG. 5.

As shown in FIG. 6, each of the cover plates 50 may also be provided with a second pair of longitudinally spaced knock-outs 72 to provide two entries into the flat portion 60 of the central cell of the electrified valley.

As shown in FIG. 6, each of the cover plates may be provided with one or more apertures 74 for the electrical grounding and mechanical attachment by a screw to the metal decking members as described hereinafter in greater detail in connection with FIGS. 7 and 8.

Figure 11:
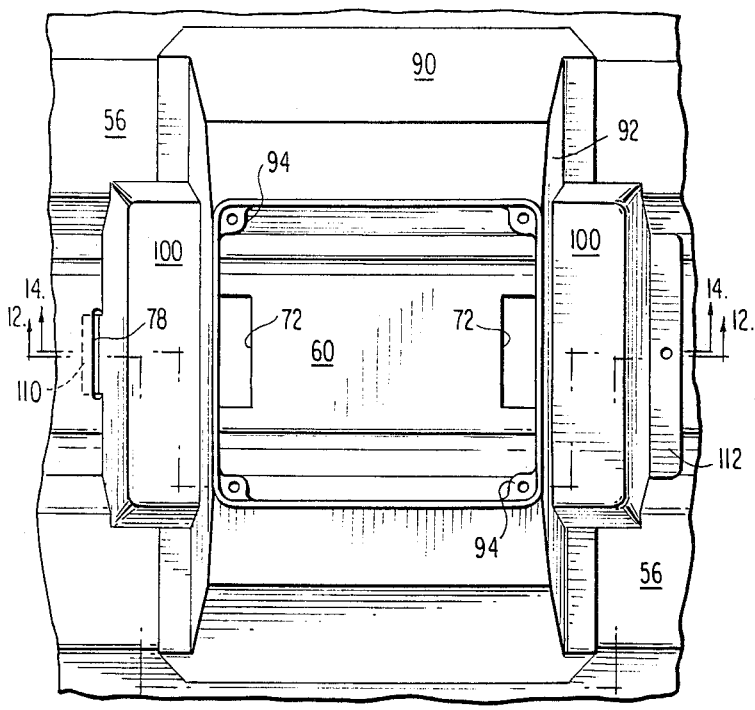
FIG. 11 is a top plan view of the preset insert of FIG. 9.

As also shown in FIG. 6, each of the cover plates may be provided with an aperture 76 and a laterally extending slot 78 located respectively laterally outside of the second pair of knock-outs 72. As is explained in greater detail in connection with the preset insert of FIGS. 11, 12 and 14, the aperture 76 and the slot 78 may be used to facilitate the rapid attachment of the preset insert 80 to the cover plate 50 as shown, for example, in FIG. 4.

As illustrated in FIG. 4, the cover plates 50 of the present invention are disposed in an end to end relationship overlying only the valleys intended to be electrified. These cover plates 50 may be of different lengths, desirably multiples of the preset insert spacing, e.g., ten to fifteen feet, and may include one grouping of knock-outs as illustrated in FIGS. 4 and 6, or more as a function of length and the need for access to the electrical wiring contained therein. Access to this electrical wiring is achieved through a plurality of preset inserts each mounted on the cover plates 50 in position to enclose one of the groupings of knock-outs.

The Preset Insert

Figure 9:
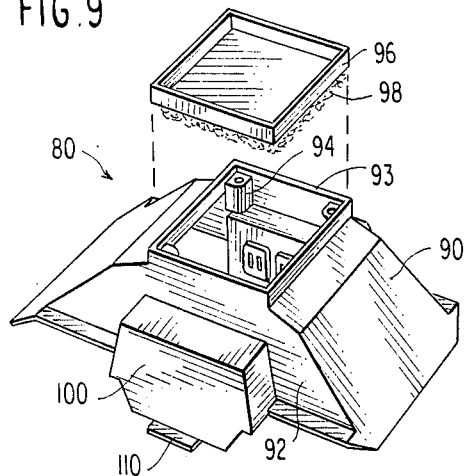
FIG. 9 is a pictorial view of one embodiment of the preset insert of the present invention.

The preset insert 80 of FIG. 4 is illustrated in greater detail in FIG. 9 and is shown mounted in the composite floor in FIG. 10. As shown in FIG. 10, each of the preset inserts 80 is carried by one of the cover plates 50, which is in turn supported by the sidewalls and floor of an interior valley of the decking members.

As also shown in FIG. 10, concrete poured on the floor when assembled will fill those valleys of the decking members not to be electrified and will be poured to a depth slightly above the top of the preset insert 80 to form a smooth planar floor. Access to the preset insert may be obtained by removal of the thin layer of concrete overlying the preset insert and access thus obtained through the first pair of knock-outs 70 of FIG. 6 into the outer two of the three longitudinal cells. Access through the preset insert may be obtained into the inner cell through the second pair of knock-outs 72 illustrated in FIG. 6.

As shown in FIG. 9 and in the more detailed view of FIGS. 11–14, the preset insert 80 may include upstanding sidewalls 90 and end walls 92 terminating in a rim 93 defining a generally rectangular opening. Retaining means 94 are desirably located in the corners of the opening and are carried by the end walls 92. These retaining means 94 desirably have a planar upper surface to support a removable top 96. While not necessary, it is desirable that the removable top 96 be provided with a layer of heat-resistant foam insulation to reduce the transfer of heat from floor to floor through unused preset inserts in the event of a fire. The insulation 98 may be seen more clearly in FIG. 14.

Figure 13:
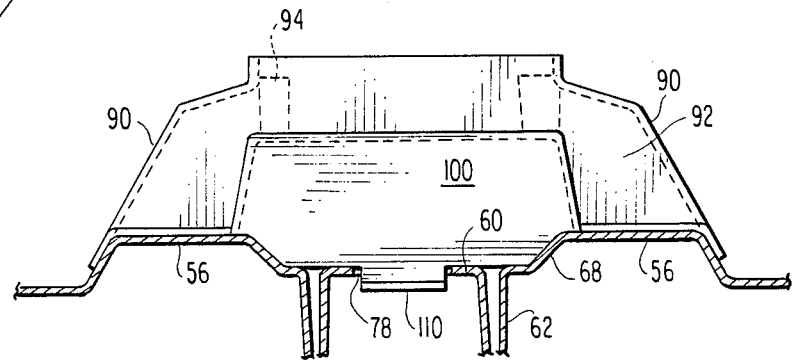
FIG. 13 is an end view in elevation of the preset insert of FIG. 9.

With continued reference to FIGS. 9, 10 and 13, the sidewalls 90 desirably overlie the sloped portion of the outer sections of the cover plates 50. As may be seen in FIGS. 9–11 and 14, the end walls desirably include a recess 100 for containing electrical terminations such as the duplex electrical power receptacle 102 illustrated in FIGS. 14 and 15. As shown in FIG. 14, each of the retaining means 94 which supports the top 96 may be notched on the underside to receive the upper edge of the mounting plate 104.

To install, the wire from the inner cell may pass upward through one of the apertures left by removal of the knock-outs 72 in the cover plate illustrated in FIG. 6 for attachment to the electrical receptacle. The upper edge of the mounting plate may be positioned beneath the retaining means 94 and the receptacle rotated downwardly as shown by the arrow in FIG. 14 until the tab 108 on the lower edge of the mounting plate enters the aperture to lock the mounting plate into position.

The preset insert 80 of the present invention may be installed on the cover plate 50 by the insertion of the tab 110 into the slot 78 and by the use of a fastener through an aperture in the flange 112 and the aperture 76 in the flat portion 60 of the cover plate. Alternatively, the cover plate of FIG. 6 may replace the aperture 76 with a slot and the preset insert provided with two tabs.

The inclined walls of the inserts permit stacking during shipment with the upper surface of the rim 93 mating with the groove 95 behind the retaining means 94.

A second embodiment of the preset insert of the present invention is illustrated in FIGS. 16–19. With reference to FIGS. 16–19, the preset insert includes upright sidewalls 114 and end walls 116 and provide a generally rectangular top opening 118 through which access to the preset insert may be made. A removable top (not shown) may be provided which may also be insulated as heretofore described.

Figure 18:
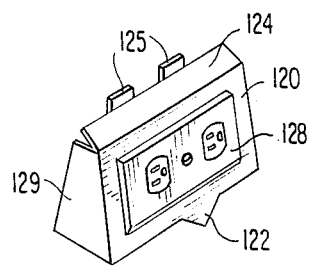
FIG. 18 is a pictorial representation of the electrical receptacle of FIG. 17.
Figure 19:
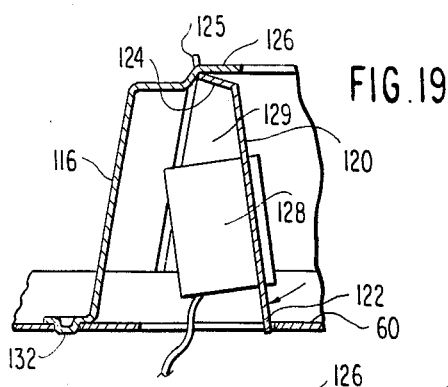
FIG. 19 is a partial section in elevation illustrating the mounting of the electrical receptacle of FIG. 18 in the preset insert of FIG. 16.

As shown in FIG. 18, the electrical terminations may comprise a mounting plate 120 having a pointed tab 122 at the lower edge and an angled flap 124 along the upper edge. The flap 124 may be provided with two tabs 125 for insertion into the slots 127 shown in FIG. 16. As shown in FIG. 19, the mounting plate may be mounted by insertion of the tabs 125 of the flap 124 through the slots 127 in the top edge 126 and downwardly rotating the mounting plate until the tab 122 penetrates the flat portion 60 of the cover plate 50. The electrical terminations carried by the mounting plate 120 may be in a suitable duplex or triplex electrical power receptacle 128, shielded by side plates 129 as shown in FIG. 18 but omitted in FIG. 19 for clarity of illustration.

Figure 16:
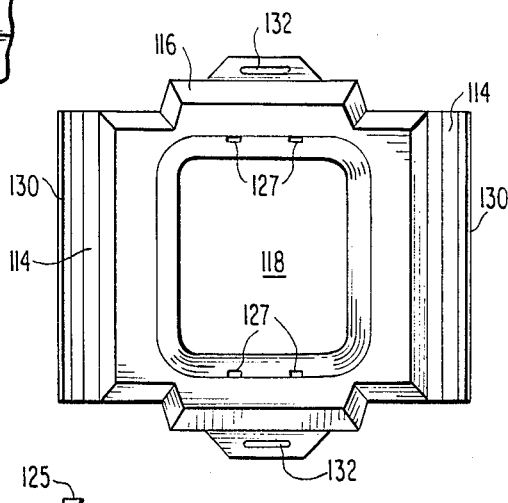
FIG. 16 is a top plan view of a second embodiment of the preset insert of the present invention.
Figure 17:
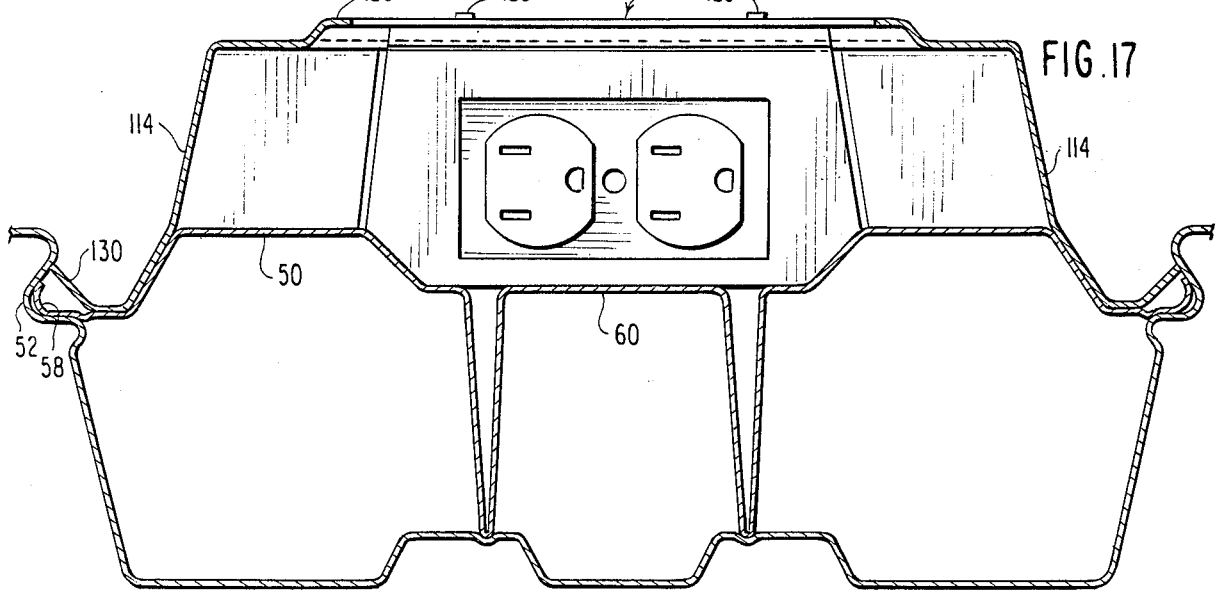
FIG. 17 is a section in elevation illustrating the mounting of the preset insert of FIG. 16 on an electrified valley.

As shown by the respective figures, one of the significant differences between the embodiment of FIGS. 16–19 and the embodiment of FIGS. 11–15 is the lower termination of the sidewalls 114. As shown in FIG. 17, the sidewalls may overlie the slanted section of the outer sections of the cover plate 50 and thereafter turn upwardly at an angle of about 45 degrees to form a flange 130 to overlie the lateral edge 58 of the cover plate 50 within the groove 52 in the sidewall 33 of the decking member. This angle provides substantial hold-down force during the construction phase.

Another distinction is the mounting of the preset insert to the cover plate. In the embodiment wherein the aperture 76 of the flat portion 60 of FIG. 6 is replaced by a longitudinal slot such as the slot 78, the tab 110 and flange 112 of the embodiment of FIGS. 11–14 may be replaced by a spring lock fastener 132 as shown in FIGS. 16 and 19.

The inclined walls facilitate stacking during shipment and the one-piece construction permits construction out of sheet metal, allowing resilient snap-in mounting of the cover plates.

The Lateral Trench

As shown in FIG. 4, a lateral trench may be formed by two side rails 139, a plurality of trench bottom plates 160 and a top plate 156 (not shown).

With reference to FIG. 20 where one embodiment of the trench of the present invention is illustrated, the side rail 139 may comprise a first elongated metal member 140 having an inverted U-shaped channel with horizontally extending horizontal flanges 142 and 144. The flanges are adapted to overlie as shown in FIG. 4 and to be secured to the crest 32 of the decking members in a suitable conventional manner such as by threaded fasteners or pop rivets.

A second elongated metal member includes a horizontal central section 146 with an upwardly and then outwardly extending section 148 on the side of the rail away from the trench. On the trench side of the horizontal center section 146, the second metal member has a downwardly extending section 150 which overlies one of the arms of the U-shaped channel when the apertures in the bottom of the U-shaped channel of the first elongated member and the horizontal center section of the second elongated member are aligned. The separation between the first and second elongated members may be vertically adjusted by means of a flanged bolt 152 and a locking nut 154. The metal plate 156 which forms the top of the trench may thus be raised or lowered from above to the height to which the concrete floor 153 is to be poured.

The projection 155 of the second member may provide a seat for a suitable spring-biased latching member 157 carried by the lower surface of the plate 156 to resiliently retain the position of the plate over the trench.

With continued reference to FIG. 20, the free ends of the cover plates may be capped by a closure 158 where the cover plates intersect the trench. This closure may be generally J-shaped in cross section as illustrated in FIG. 21, having an edge turned away from the trench to present a smooth rounded surface and to thereby avoid possible damage to the electrical wires passing to the cell from the trench. The closure 158 may be fastened to the first elongated member of the rail, by fasteners through pre-punched holes located so as to avoid penetration into an electrified cell, e.g., with the depression between the flat portion 56 of the cover plate 50 and the laterally outermost portion of the crest 32 of the decking member. Alternatively, or additionally, the pre-punched holes may be aligned with the gap between the legs of the cover plate 50, e.g., in the distance D-3 in FIG. 5.

A second embodiment of the trench is illustrated in FIG. 22 wherein the lower member of the rail of FIG. 20 is replaced by a member having an inverted U-shaped channel 171 with a laterally extending flange 172 on the side thereof away from the trench and an upwardly extending flange 174 on the trench side thereof. The extreme lower end of the U thus formed may be slit to provide sliding access of a J-shaped closure member 176 therebetween. This J-shaped member 176 is illustrated in FIG. 23, and may be held therein by friction and the resilient pressure of the leg of the inverted U-shaped member and the flange 174.

The bottom plates 160 of FIG. 4 may conform to the configuration of the cover plates 50 at their ends to mate with the grooves on the sidewalls of the decking members. Alternatively, they may comprise downwardly slanted edges 164 as shown in FIGS. 24 and 25 for supporting the surface 160 coplanar with the crest 32 by insertion into the grooves 52 of the decking members as they pass beneath the trench.

While not shown in FIG. 24, the surface 160 may include spaced longitudinal grooves in the areas of the valleys to provide additional stiffening.

The lateral edges of the bottom plates 160 may be provided with flanges 162 to overlie the flange 144 of the side rails as shown in FIG. 26. In this way, the lateral sides of the bottom plates may be secured to and supported by the side rails.

Figure 27:
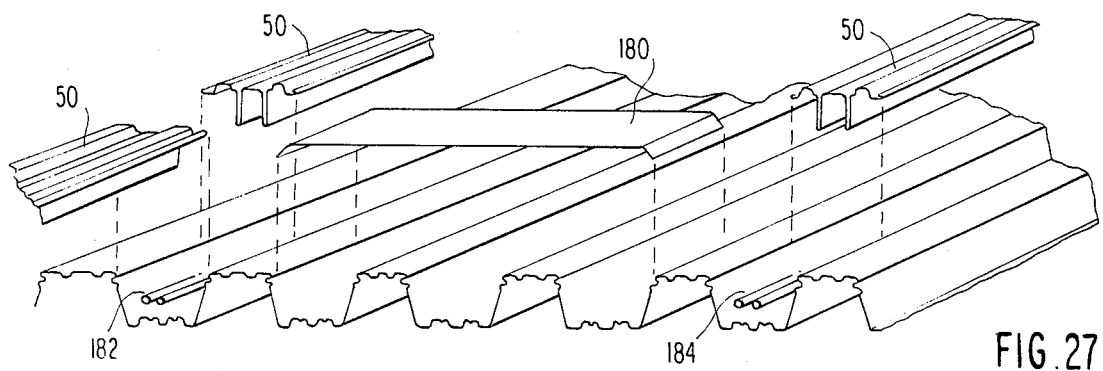
FIG. 27 is a pictorial view of a third embodiment of the trench bottom plates of FIG. 4.

As shown in FIG. 27, the bottom plates 160 of FIG. 4 may be replaced by a single layer bottom plate 180 configured like the bottom plate of FIG. 24 but spanning more than a single valley in the area between the side rails of the trench and between electrified valleys 182 and 184.

The bottom plates serve to keep concrete poured into the non-electrified valleys, i.e., those valleys not covered by a cover plate 50, from rising above the level of the decking into the trench. The use of bottom plates permits the entry of concrete beneath the trench in all non-electrified valleys and thus enhances the structural integrity of the composite floor.

Figure 28:
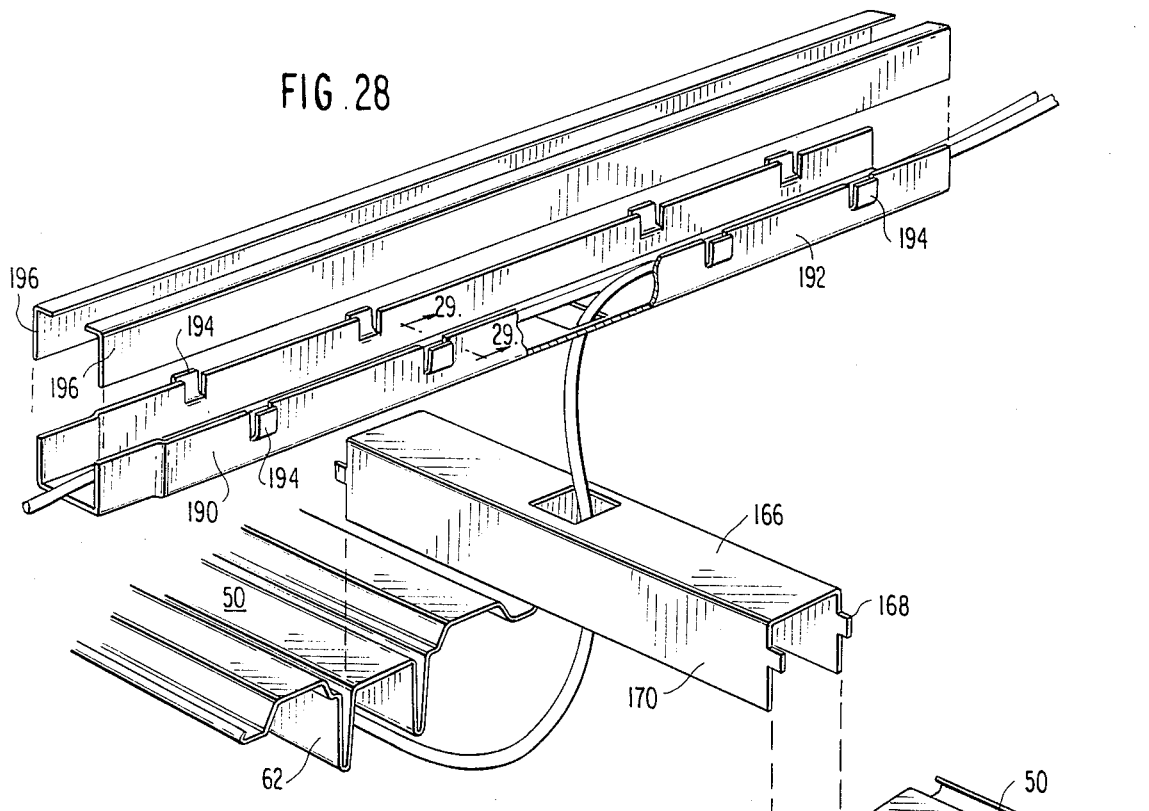
FIG. 28 is an exploded pictorial view showing the central cell partition for the trench and for an electrified valley in the area beneath the trench.

It may be desirable for the central longitudinal cell of an electrified valley to pass beneath the trench and to have access to the electrical services in the outer longitudinal cells. If desired, a partition such as illustrated in FIG. 28 may be utilized. With reference to FIG. 28, the partition 166 may be made of sheet metal in an inverted U-shaped cross-section with longitudinally extending tabs 168 extending from the longitudinal extremities of the legs 170. These tabs 168 may be placed between the dual wall legs 62 of the cover plate 50 to provide lateral stability as also shown in FIGS. 4, 20 and 22. In addition, the bottom edges of the legs 170 of the partition 166 may rest in the grooves 48 in the valleys of the decking members illustrated in FIG. 5 to prevent lateral movement.

It is generally necessary to separate the electrical power service from the telephone and other services within the trench. A separate power compartment may be formed as shown in FIG. 28 by a three-piece power cell designed to overlie the crests of the decking members parallel to but spaced from the side rails of the trench illustrated in FIG. 4.

Figure 29:
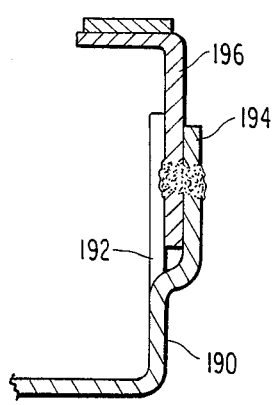
FIG. 29 is a section taken through lines 29—29 of FIG. 28.

With continued reference to FIG. 28, the power compartment may include a plurality of U-shaped members 190 each crimped on one end in the manufacturing process to facilitate the end-to-end joining thereof. The upstanding side walls 192 of the member 190 may be provided with a plurality of spaced fingers 194 adapted to frictionally receive side wall extensions 196 with inwardly or outwardly extending horizontal flanges. Once in place and adjusted to the desired height, the side wall extension 196 may be spot welded or otherwise secured to the walls and/or fingers as shown in FIG. 29 to permanently fix the height thereof.

As shown in FIG. 28, the electrical power service may be brought laterally across the composite floor within the power compartment of the trench, exit downwardly through a suitable aperture into the partition 166 and thence into the central cell of an electrified valley. The aperture in the bottom of the member 190 is desirably provided with rounded corners with the entire periphery flared downwardly in the direction of passage of the electrical power service to eliminate the necessity to grommet the aperture.

As suggested in FIG. 4, the service may then travel longitudinally along an electrified valley to the receptacle of one of the preset inserts spaced along the electrified valley just beneath the concrete floor.

ADVANTAGES AND SCOPE OF THE INVENTION

The many advantages of the present invention should be readily apparent. By way of example, the novel decking profile provides increased strength and stacking stability over known prior art profiles. The groove construction facilitates concrete holddown, the snap-in of cover plates, the snap-in of preset inserts, and the snap-in of bottom plates for the lateral trench.

The cover plates are self-supporting intermediate adjacent crests and provide for these services in a single valley. By the use of the present construction, metal/concrete interaction is retained with no significant diminution of the cell area. The one-piece construction provides ease of manufacture and the resiliency necessary for proper snap-in retention.

The novel decking profile provides adequate metal/concrete interaction, even with cover plates and preset inserts retained therein.

In combination with the profile of the cover plates, sufficient space is provided for three services, with cell division provided by the resilient double walled legs.

Access to the cells beneath the cover plates is easily obtained through snap-in preset inserts with snap-in electrical receptacles.

The use of trench rails of sheet metal significantly reduces the expense of the trench system, and the use of trench bottom plates eliminates the need to stop the concrete in non-electrified valleys by vertical concrete stops, thereby improving the strength of the composite floor.

The unique cooperation of the various elements of the system of the present invention significantly reduces labor costs. Moreover, many of the components are stackable and thus reduce both the expense of shipment and the space required for on-site storage.

These and many more advantages will be readily apparent to one skilled in the relevant art. The invention is defined in the appended claims, the scope of which is therefore to include, without limitation, the exemplary embodiments disclosed in the foregoing specification when given a wide range of equivalents.

What is claimed is:

1. A composite concrete and electrified metal decking floor comprising:
    (a) a plurality of metal decking members each having a plurality of alternating coplanar crests and coplanar valleys connected by slanting sidewalls, the upper portion of each of said sidewalls having a groove adjacent the connection of the sidewall with the adjacent one of said crests,
    each of said crests having a longitudinal stiffening bead and each of said valleys having two horizontally spaced longitudinal leg engaging support means;
    (b) a plurality of elongated cover plates each having a generally flat upper surface with a plurality of spaced apertures, outwardly convex and upturned lateral edges and a pair of laterally spaced, longitudinally extending legs, each of said cover plates being dimensioned to overlie one of said valleys with said lateral edges engaging one of the grooves in said sidewalls and with the lower end of the legs thereof engaging the support means in the underlying one of said valleys to thereby support the upper surface of the cover plate generally coplanar with said crests, said cover plates being positioned in longitudinal succession over selected ones of said valleys so that said legs longitudinally partition the area bounded by the cover plate, the valley underlying the cover plate and the adjacent sidewalls into three longitudinally extending electrical cells;
    (c) a plurality of preset inserts each having upstanding side and end walls, a removable top and a plurality of electrical terminals, the lower edge of said side and end walls being configured to mate with the top of one of said cover plates surrounding said apertures so that electrical conductors disposed in one of said cells may pass upwardly through one of said apertures for connection to one of said terminals;
    (d) an electrical distribution trench including:
    a first plurality of elongated metal rails carried by the crests of said decking members in an end-to-end relationship in a direction transverse to said decking members,
    a second plurality of elongated metal rails carried by said decking members in an end-to-end relationship parallel to and spaced from said first plurality of rails to thereby define the sides of the trench,
    a plurality of flat metal plates carried in an end-to-end relationship by said rails to thereby define the top of the trench, a plurality of flat bottom members each having means at the ends thereof for engaging one of the grooves in said decking members, said bottom members being dimensioned to cover one of said valleys between the sides of the trench to thereby define with said crests the bottom of the trench except at the junction of the trench with an electrified valley so that electrical conductors disposed in one of said cells may pass upwardly into the trench; and (e) concrete overlying said decking, said cover plates and selected ones of said preset inserts to a depth sufficient to define floor planar with said metal plates.

2. The composite concrete and electrified metal decking floor of claim 1 wherein each of said cover plates comprises:

a single elongated sheet of metal with three lateral sections, the outer two of three said sections having a flat portion at a first elevation and an outer edge portion at an elevation lower than that of said flat portions for positioning said flat portions substantially coplanar with said crests when said outer edge portion engages the grooves in said sidewalls, the inner one of said three sections having a flat portion interconnected with the flat portions of said outer sections by said legs, said legs being resiliently compressible in a lateral direction adjacent said flat portions sufficient to permit a snap-in engagement of said outer edge portions with the grooves in said sidewalls.

3. The floor of claim 2 wherein the elevation of the flat portions of inner section of said cover plates is less than the flat portion of the two outer sections thereof, wherein said legs are joined to the flat portions of said outer portions by a section including an upwardly and outwardly inclined portion, and wherein the apertures in said cover plates include a first pair of knock-outs, each laterally spanning the width of one of said inclined portions and more than about seventy-five percent of the width of one of said flat portions to thereby provide a downward and outward angled entry from said preset insert into the outer two electrical cells.

4. The floor of claim 1 wherein the sidewalls of each of said decking members include a longitudinal rib projecting into the valley adjacent each of said grooves, said grooves and projections being dimensioned so that the maximum extent of said projection is approximately aligned vertically with the portion of the sidewall of an identical underlying decking member at a vertical distance below the lower sidewall of said grooves equal to the distance between said crest and the lower sidewall of said groove so that lateral stability of the stacked decking member during shipment is enhanced.

5. The floor of claim 1 wherein the lower side of said groove is generally horizontal and the upper side thereof is joined thereto and inclined to the horizontal at an angle between about forty and forty-five degrees, wherein the radius of curvature of the junction of the two sides of said grooves and the radius of curvature of the connection of the upper side of said groove and said crest is approximately the same, and wherein the radius of curvature of the connection of the lower side of said groove and the lower portion of said sidewall is greater than the radius of curvature of the connection of the upper side of said groove and said crest by little more than the thickness of said metal decking members, whereby one of said decking members may be stacked on another of said decking members for shipment with the connection of the lower side of said groove and the lower portion of said sidewall of the overlying decking member supported by the connection of the crest and upper side of the groove of an underlying decking member to provide lateral stability of stacked decking members during shipment.

6. The floor of claim 1 wherein each of the legs of said cover plate is integral with said cover plate, resiliently spaced apart at the upper end, and joined together at the lower end.

7. The floor of claim 1 wherein said preset insert includes retaining means adjacent each of said end walls, and wherein said electrical terminals include a pair of plural outlet electrical receptacles carried by a mounting plate, said mounting plate being adapted at the upper end thereof for engagement with said retaining means and being adapted at the lower end thereof for engagement with apertures in said cover plate.

8. The floor of claim 7 wherein the end walls of said preset inserts include recesses sufficient to receive one of said receptacles when said mounting plate engages the retaining means of said insert and the edge engaging one of said apertures.

9. A three-cell electrified metal floor comprising:

a plurality of metal decking members each having a plurality of alternating coplanar crests and coplanar valleys connected by slanting sidewalls, the upper portion of each of said sidewalls having a groove adjacent the connection of the sidewall with the adjacent one of said crests, each of said valleys having laterally spaced longitudinal support means for engaging the lower ends of legs; and a plurality of snap-in cover plates each having a generally flat upper surface, outwardly convex and upturned lateral edges and a pair of laterally spaced, longitudinally extending legs, each of said cover plates being dimensioned to overlie one of said valleys with said lateral edges engaging one of the grooves in said sidewalls and with the lower ends of said legs engaging said support means to thereby support the upper surface thereof generally coplanar with the adjacent ones of said crests, said cover plates being sufficiently resiliently compressible in a lateral direction to permit entry of said lateral edges into said grooves, said legs longitudinally partitioning the area bounded by said cover plate, the valley underlying said cover plate and the immediately adjacent sidewalls into three longitudinal electrical cells.

10. The floor of claim 9 wherein said cover plate has two laterally outer sections each having a flat portion and a flat central section vertically below the plane of said crests, said legs being joined to the flat portions of said outer sections by a portion including an upwardly and outwardly inclined portion, and including a first pair of knock-outs, each laterally spanning the width of one of said inclined portions and more than about seventy-five percent of the width of one of said flat portions to thereby provide a downwardly and laterally outwardly slanted entrance to the outer two cells.

11. The floor of claim 10 including a preset insert comprising a housing having upright side and end walls and a removable cover, the lower portion of said side and end walls being adapted to overlie said cover plate in conformity therewith to thereby enclose said knockouts.

12. The floor of claim 11 wherein the housing of said preset insert includes retaining means adjacent each of said end walls; and
   wherein said preset insert further includes a pair of plural outlet electrical receptacles carried by a mounting plate, said mounting plate being adapted at the upper end thereof for engagement with said retaining means and being adapted at the lower end thereof for engagement with an aperture created by the removal of a knock-out in said central section.

13. The floor of claim 12 wherein the end walls of said preset inserts include recesses sufficient in size to receive one of said receptacles when said mounting plate engages said retaining means and said aperture.

14. The floor of claim 9 wherein the valleys of each of said decking members include two laterally spaced longitudinally extending upward projections, each adapted to engage and laterally restrict movement of the ends of one of the legs of said cover plates.

15. The floor of claim 11 wherein each of said legs is integral with said cover plate, having dual walls spaced apart at the upper end and joined together at the lower end thereof.

16. A composite concrete and electrified metal decking floor comprising:
   (a) a plurality of metal decking members each having a plurality of alternating substantially coplanar crests and substantially coplanar valleys connected by slanting sidewalls, the upper portion of each of said sidewalls having a groove adjacent the connection of the sidewall with the adjacent one of said crests,
   (b) a first plurality of elongated metal rails carried by the crests of said decking members in an end-to-end relationship in a direction transverse to said decking members,
   (c) a second plurality of elongated metal rails carried by said decking members in an end-to-end relationship parallel to and spaced from said first plurality of rails to thereby define the sides of a trench overlying said decking members,
   (d) a plurality of flat metal top plates carried in an end-to-end relationship by said rails to thereby define the top of the trench,
   (e) a plurality of substantially flat, substantially metal bottom members each having means at the ends thereof for engaging one of the grooves in the sidewalls of said decking members, said bottom members being dimensioned to overlie one of said valleys between the sides of the trench to thereby define with said crests the bottom of the trench; and
   (f) concrete overlying said decking and said bottom members to a depth sufficient to define with said top plates a planar floor.

17. The floor of claim 16 wherein one of said valleys is electrified,
   wherein no bottom member is used at the junction of the trench with said electrified valley so that electrical conductors disposed in said electrified valley may pass upwardly into the trench;
   wherein said electrified valley includes longitudinal partitioning means dividing said valley into three longitudinal cells; and
   including a cross-trench partition comprising integral sides and top, each of said sides having longitudinally extending tabs on both ends thereof for engaging the partitioning means of said decking members on both sides of said trench.

18. The floor of claim 17 wherein each of said bottom members includes longitudinal edges inclined downwardly and then outwardly to curve upwardly and thereby present an upwardly curved, outwardly convex edge for engagement with said groove.

19. The floor of claim 16 wherein each of said bottom members includes longitudinal edges inclined downwardly and then outwardly to curve upwardly and thereby present an upwardly curved, outwardly convex edge for engagement with said groove.

20. A metal decking comprising alternating coplanar crests and coplanar valleys connected by slanted sidewalls wherein the upper portion of said sidewalls includes a longitudinally extending groove immediately adjacent said crests and a longitudinally extending rib immediately below said groove.

21. The metal decking of claim 20 wherein the upper portion of said sidewalls is dimensioned so that the distance between the ribs on opposite sides of said crests is only slightly less than the distance between the inner surfaces of the lower portion of said decking member at the elevation of said ribs so that engagement of the ribs of an underlying decking section with the sidewalls of an overlying decking section when stacked thereon with the groove of said overlying decking member supported by the crest of said underlying decking member provides lateral stability to the decking members.

22. The metal decking of claim 21 including two laterally spaced longitudinally extending stiffening beads in each of said crests, and two longitudinally extending stiffening beads in each of said valleys.

23. A metal decking member comprising alternating coplanar crests and coplanar valleys connected by slanted sidewalls wherein the upper portion of each of said sidewalls includes a groove, the lower side of said groove being generally horizontal and the upper side of said groove being joined thereto and inclined to the horizontal at an angle between about forty and forty-five degrees,
   the radius of curvature of the junction of the two sides of said groove and the radius of curvature at the connection of the upper side of said groove and said crest being approximately equal, and
   the radius of curvature at the connection of the lower side of said groove and the lower portion of said sidewall being greater than the radius of curvature of the connection of the upper side of said groove and said crest by slightly more than the thickness of the metal decking,
   the connection of the upper side of said groove to said crest being substantially over the connection of the lower side of said groove to said sidewall,
   whereby said decking member may be stacked on an identical underlying decking member with the connection of the lower side of said groove and said sidewall supported by the connection of the crest and upper side of the groove of the underlying decking member to provide increased lateral support for said decking member when stacked.

24. The metal decking member of claim 23 wherein each of said crests includes a longitudinal stiffening bead, and
wherein each of said valleys includes two longitudinal stiffening beads.

25. In combination with metal decking having alternating crests and valleys and an apertured cover plate for selected ones of the valleys to define with the underlying valley an electrical raceway, a preset insert having a housing having a removable top and upright sidewalls and with retaining means adjacent thereto, the lower portion of said side and end walls being adapted to overlie the apertures in said cover plate in conformity with the upper surface of the cover plate thereby to enclose the apertures; and
including a pair of plural outlet electrical receptacles carried by a mounting plate, said mounting plate being adapted at the upper end thereof for engagement with said retaining means and being adapted at the lower end thereof for engagement with one of the apertures in the cover plate.

26. The preset insert of claim 25 wherein the removable top of said preset insert is insulated.

27. The preset insert of claim 25 wherein said end walls include recesses sufficient to receive one of said receptacles when said mounting plate engages said retaining means and said aperture.

28. In an electrified metal floor including decking members with alternating crests and valleys, at least one of the valleys being partitioned to provide three parallel electrical cells, and a lateral trench overlying the decking members, a metal partition extending the central one of said three cells through the portion of the partitioned valley underlying the trench, said partition comprising integral sides and top, each of said sides having longitudinally extending tabs on both ends thereof for engaging the partitions of said decking members on both sides of said trench.

29. In a trench having parallel sides rails crossing the alternating crests and valleys of a metal decking and a removable cover plate carried by said rails, a plurality of bottom plates each comprising a flat portion dimensioned to span the width of the trench and the distance between adjacent of said crests, said flat portion having lateral edges extending upwardly and then outwardly to overlie a horizontal flange on said rails and having longitudinal edges inclined downwardly to engage a groove in the sidewalls of the metal decking.

30. The bottom plates of claim 29 wherein said longitudinal edges incline downwardly and then outwardly to curve upwardly and thereby present an upwardly curved, outwardly convex edge for engagement with said groove.

31. A metal floor comprising:
a plurality of decking members, each having a plurality of alternating substantially coplanar crests and substantially coplanar valleys connected by slanting sidewalls,
the upper portion of each of said sidewalls having a groove adjacent the connection with the adjacent one of said crests;
a plurality of snap-in cover plates each having a generally flat, apertured upper surface, outwardly convex lateral edges adapted to engage one of the grooves in said sidewalls to support said upper surface generally coplanar with the adjacent ones of said crests; and
a preset insert including a housing having upright side and end walls, the lower portion of said end walls being adapted to overlie said cover plate in conformity therewith to thereby enclose an aperture in said upper surface, the lower portion of said side walls terminating in an outwardly convex lateral edge adapted to be received in the groove in said sidewalls in an overlying relation to the lateral edges of one of said cover plates.

32. The floor of claim 31 wherein each of said cover plates includes a pair of laterally spaced, longitudinally extending legs adapted to engage the underlying valley to thereby longitudinally partition the area bounded by the cover plate, the valley underlying the cover plate and the adjacent sidewalls into three electrical cells.

33. A side rail for the lateral trench of an electrical distribution system in a composite metal/concrete floor comprising:
a first elongated metal member including in cross-section an inverted U-shaped channel with outwardly extending horizontal flanges adapted to be secured to the crests of corrugated metal decking members,
a second elongated metal member including in cross-section a horizontal center section, a downwardly extending section on the trench side thereof, and an upward and then horizontally outwardly extending section on the side thereof away from the trench,
the bottom of said U-shaped channel and rail horizontal section having apertures aligned when said second member is disposed in an overlying relationship to said first member with the downward extending section in sliding contact with the wall of said U-shaped channel along the length thereof on the trench side thereof,
threaded means for adjusting the vertical separation between said first and second members; and
a plurality of generally U-shaped partitions each having a generally horizontal flange and a downwardly extending generally vertical flange curved at the lower end thereof away from the trench, said flange curving beneath the end of the decking members supporting the rail when said horizontal flange is positioned over the horizontal flange of said first member to thereby provide a smooth end surface for the decking members.

34. A side rail for a lateral trench of an electrical distribution system in a composite metal/concrete floor comprising:
a first elongated metal member including in cross-section an inverted U-shaped channel with a horizontal flange on the side thereof away from the trench adapted to be secured to the crests of corrugated metal decking members, and an upwardly extending flange spaced from and generally parallel to said channel on the trench side thereof;
a second elongated metal member including in cross-section a horizontal center section, a downwardly extending section on the trench side thereof, and an upward and then horizontally outward section on the side thereof away from the trench,
the bottom of said U-shaped channel and said horizontal section having apertures aligned when said second member is disposed in an overlying relationship to said first member with the downward extending section of said second member in sliding contact with the upwardly extending flange of said first member along the length thereof on the trench side thereof, and threaded means for adjusting the vertical separation between said first and second members.

35. The rail of claim 34 wherein said upwardly extending flange is apertured adjacent the junction with said channel; and including a plurality of elongated partitions each having a lower portion with a curved lower edge and an upper portion adapted to pass upwardly through said apertures between said channel and said upturned flange so that said curved edge lies beneath the end of the decking members with said lower portion overlying the end surface of the decking members.

36. A method of installing a metal/concrete composite floor with three longitudinal cells at spaced intervals comprising the steps of:

(a) installing metal decking having alternating longitudinally extending crests and valleys with grooves in the side walls adjacent the crests;

(b) providing cover plates having two longitudinally extending, laterally spaced legs depending therefrom;

(c) installing the cover plates over selected ones of the valleys in the decking with the lateral edges thereof engaging the grooves in adjacent side walls and with the two longitudinally extending legs engaging the valley along laterally spaced lines to provide support for the cover plate intermediate the crests and to divide the enclosed valley into three longitudinal cells;

(d) installing upwardly extending preset inserts at spaced intervals along the upper surface of the installed cover plates with the lateral edges thereof engaging the grooves in the side walls of metal decking; and (e) pouring concrete over the decking, the cover plates and the preset inserts to a height slightly greater that the height of the top of the preset inserts to form a composite metal/concrete floor.

37. The method of claim 36 including the further steps prior to the concrete pour of:

(e) installing a pair of adjustable height rails laterally across the crests of the metal decking in a spaced parallel relationship;

(f) installing a plurality of bottom plates at the approximate height of the crests of the decking in the area between the rails; and (g) adjusting the height of the rails to the height to which the concrete is to be poured.

38. The method of claim 36 including the further steps of:

(e) installing a pair of adjustable height rails laterally across the crests of the metal decking in a spaced parallel relationship;

(f) installing a plurality of bottom plates at the approximate height of the crests of the decking in the area between the rails with the longitudinal edges of the bottom plates engaging the grooves in the side walls of the metal decking; and (g) adjusting the height of the rails to the height to which the concrete is to be poured.

* * * * *